United States Patent [19]

Olmr et al.

[11] Patent Number: 4,980,592
[45] Date of Patent: Dec. 25, 1990

[54] FLYWHEEL MAGNET ROTOR ASSEMBLY

[75] Inventors: Jaroslav J. Olmr, Rock Hill, S.C.; Lakhbir S. Suchdev, Charlotte, N.C.

[73] Assignee: Textron, Inc., Providence, R.I.

[21] Appl. No.: 403,291

[22] Filed: Sep. 1, 1989

[51] Int. Cl.$^5$ .............................................. H02K 21/22
[52] U.S. Cl. ........................................ 310/153; 310/42; 310/43; 310/74; 310/156; 310/218; 310/262; 123/149 D
[58] Field of Search ............ 310/74, 153, 51, 43, 310/70 R, 70 A, 156, 62, 63, 261, 218, 42, 262; 123/149 R, 149 D, 149 E; 322/94; 74/572, 573 R, 574

[56] References Cited

U.S. PATENT DOCUMENTS

| | | | |
|---|---|---|---|
| 2,978,598 | 4/1961 | Kato | 310/43 |
| 3,218,492 | 11/1965 | Babitzka | 310/70 |
| 3,617,786 | 11/1971 | Stielper | 310/242 |
| 4,048,530 | 9/1977 | Kaufman, Jr. | 310/89 |
| 4,056,882 | 11/1977 | Letts | 29/597 |
| 4,082,972 | 4/1978 | Gerber et al. | 310/162 |
| 4,128,527 | 12/1978 | Kinjo et al. | 260/42.18 |
| 4,146,806 | 3/1979 | Katsumata | 310/153 |
| 4,179,634 | 12/1979 | Burson | 310/156 |
| 4,206,379 | 6/1980 | Onda | 310/156 |
| 4,219,752 | 8/1980 | Katou | 310/156 |
| 4,241,620 | 12/1980 | Pichl et al. | 74/573 R |
| 4,358,727 | 11/1982 | Campen | 310/70 A |
| 4,390,804 | 6/1983 | Orova et al. | 310/70 R |
| 4,423,345 | 12/1983 | Nilsson | 123/149 D |
| 4,482,831 | 11/1984 | Notaras | 123/149 R |
| 4,483,306 | 11/1984 | Kawashima | 123/149 R |
| 4,550,697 | 11/1985 | Campen | 123/149 R |
| 4,573,258 | 3/1986 | Io et al. | 29/596 |
| 4,588,912 | 5/1986 | Shinmura et al. | 310/68 R |
| 4,599,464 | 12/1985 | Stokes | 310/233 |
| 4,603,664 | 8/1986 | Jackson | 123/149 R |
| 4,623,810 | 11/1986 | Smith | 310/90 |
| 4,631,433 | 12/1986 | Stokes | 310/89 |
| 4,636,202 | 1/1987 | Ebner | 310/235 |
| 4,641,422 | 2/1987 | Weaver | 29/598 |
| 4,710,659 | 12/1987 | Takano et al. | 310/153 |

Primary Examiner—R. Skudy
Attorney, Agent, or Firm—Perman & Green

[57] ABSTRACT

A flywheel magnet rotor assembly. The assembly comprises a core, a magnet, two pole shoes and a molded resin disk. The core is comprised of metallic nonferromagnetic material forming a general can shape with apertures through a first wall. The magnet is sandwiched between the pole shoes inside the can shape and portions of the pole shoes extend out the apertures. The molded resin disk substantially surrounds the core.

16 Claims, 2 Drawing Sheets

FLYWHEEL MAGNET ROTOR ASSEMBLY

BACKGROUND OF THE INVENTION

1. Field of the Invention

The present invention relates to rotors and, more specifically, to a flywheel magnet rotor assembly and a method of making the same.

2. Prior Art

There are numerous different types of flywheels, magnet rotors and commutators known in the art. U.S. Pat. No. 4,710,659 to Takano et al. discloses a resin molded rotor for a magneto generator having a magnet, a molded resin disk, and a ferromagnetic metal core having two poles integrally formed on the core and a pair of bridges connecting a first magnet pole receiving portion with a second magnet pole receiving portion.

U.S. Pat. No. 4,390,804 to Orova et al. discloses a magneto generator having a magnet wheel with two pole pieces embedded in a body of a non-magnetic material that defines the shape of the wheel having fan blades. The magnet is fastened between pole plates with each of the pole faces of the magnet abutting one of the pole plates.

U.S. Pat. No. 4,241,620 to Pichl et al. discloses a balance wheel made of non-ferrous metal having a magnet and a ring of magnetic material.

Various different problems exist in the prior art. A principal problem with prior art magnet rotors is that their relatively heavy weight make small portable engine driven tools relatively heavy.

Another principle problem with prior art relatively light weight rotors is that ferromagnetic cores which are also used as pole plates result in magnetic loses through shunting of magnetic flux and thus, the loss of potential energy.

Another problem with prior art devices is that engine driven tools having relatively light rotors generally have inadequate inertia which produces engine torque fluctuations and increases cranking effort.

Another problem with prior art devices is that engine driven tools having relatively light rotors have inadequate internal mechanical strength which can result in bursting of the rotor at high speeds such as in excess of 25,000 RPM.

Another problem with prior art rotors is that it is preferable to fasten a rotor to a shaft with a tapered hub, but light weight rotors of the prior art require separate inserts to provide a tapered hub thus, increasing assembly and manufacturing costs and time.

It is therefore an objective of the present invention to provide a light weight rotor especially suitable for small portable engine driven tools with sufficient inertia to smoothen engine torque fluctuations, ease cranking effort and reduce the tool weight.

It is another objective of the present invention to provide a light weight rotor having a can shaped core for containing a magnet, a counterweight and pole shoes, for providing mechanical integrity of the rotor, and thereby for preventing bursting of the rotor at high speeds.

It is another objective of the present invention to provide a light weight rotor having a tapered hub integral to a stamped structural core and thereby lower manufacturing costs and assembly time.

It is another objective of the present invention to provide a magnet rotor with substantially small internal magnetic losses.

SUMMARY OF THE INVENTION

The foregoing problems are overcome and other advantages are provided by a flywheel magneto rotor assembly having a core forming a general can shape for providing mechanical integrity of the rotor assembly.

In accordance with one embodiment of the invention, a flywheel magnet rotor assembly is provided comprising a core means, magnet means, pole means and a molded resin disk means. The core means is comprised of a rigid nonferromagnetic material. The core means has a top wall and side walls forming a general can shape. One of the core means side walls has an aperture means therethrough. The magnet means comprises a permanent magnet located inside the general can shape with a magnetic north pole and a magnetic south pole proximate the aperture means. The pole means comprises first and second ferromagnetic pole shoes. The first pole shoe has a first portion extending through the aperture means and a second portion being located adjacent to the magnetic north pole of the magnet. The second pole shoe has a first portion extending through the aperture means and a second portion being located adjacent the magnetic south pole of the magnet. The molded resin disk means substantially surrounds the core means whereby there are substantially no magnetic losses between the magnet means and the core means, and substantially all of the magnetic flux from the magnet means can be directed through the pole shoes.

In accordance with one method of the invention, a method of manufacturing a flywheel magnet rotor assembly is provided comprising the steps of forming a core from a relatively rigid nonferromagnetic material, the core having a top wall and side walls, one of the side walls having at least two apertures extending therethrough; positioning pole shoes into each one of the apertures, the pole shoes each having a first portion extending through the apertures and second portions; positioning a magnet between opposite pole shoe second portions with a magnetic north pole of the magnet proximate a first pole shoe and an opposite magnetic south pole of the magnet proximate a second pole shoe; and molding a resin disk cover onto the core.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
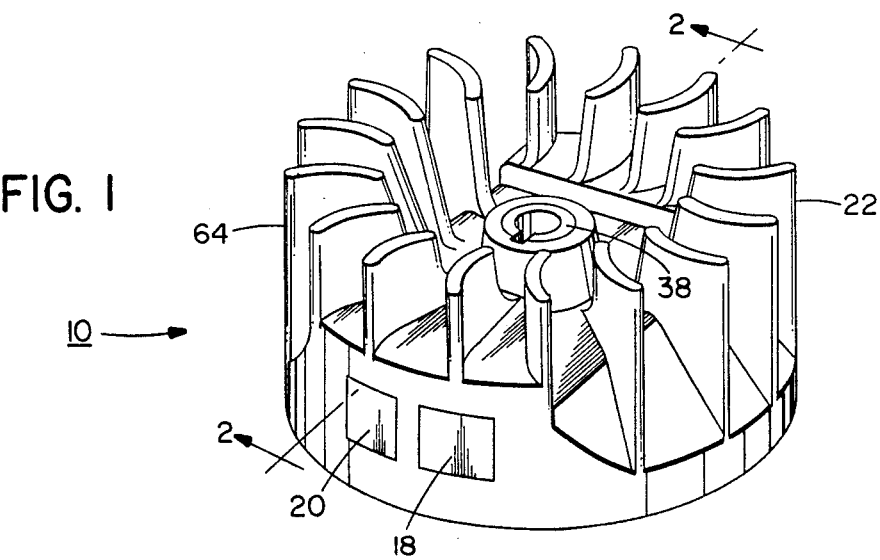
FIG. 1 is a perspective view of a flywheel magnet rotor assembly incorporating features of the present invention.

Referring to FIG. 1, a perspective view of a flywheel magnet rotor assembly 10, for use with an internal combustion engine (not shown), incorporating features of the present invention is shown. Although the features of the present invention will be described in detail with regard to the embodiment shown in FIG. 1, it should be understood that the present invention can be embodied in many alternate forms and is not necessarily limited to the embodiment shown in FIG. 1. In addition, it should be understood that the present invention could include any suitable size, shape or type of materials without departing from the spirit of the invention.

Figure 2:
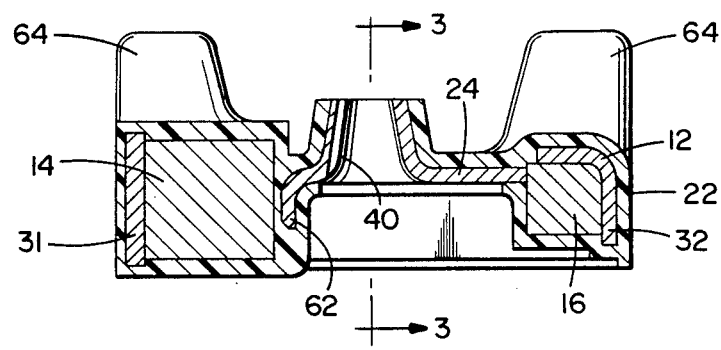
FIG. 2 is a cross sectional view of the rotor assembly shown in FIG. 1 taken along the line 2—2.
Figure 3:
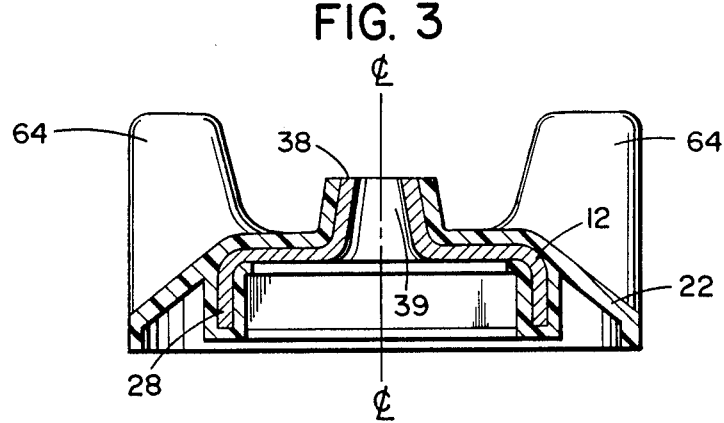
FIG. 3 is a cross sectional view of the rotor assembly shown in FIG. 2 taken along the line 3—3.
Figure 4:
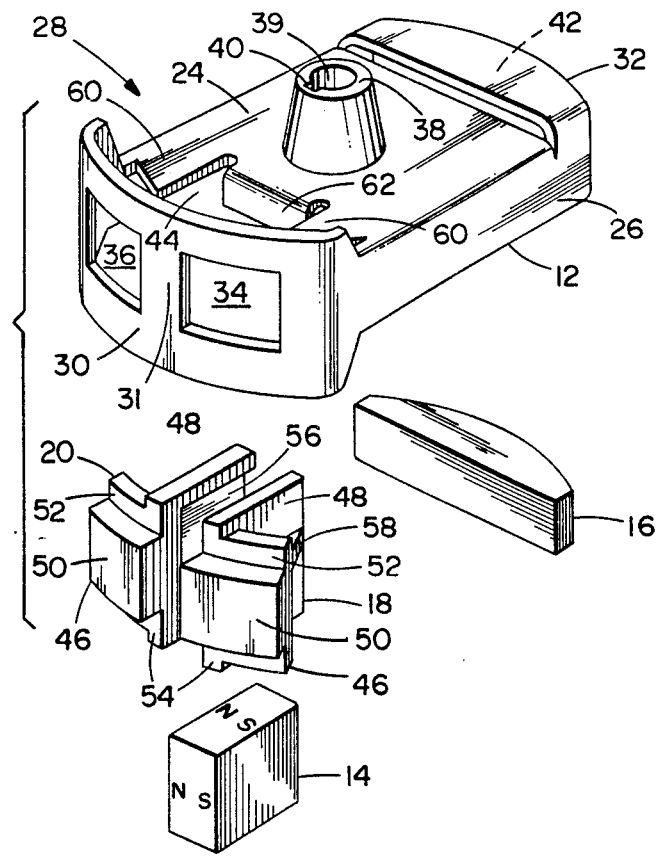
FIG. 4 is a partial exploded view of the rotor assembly of FIG. 1 without its molded resin disk.
Figure 5:
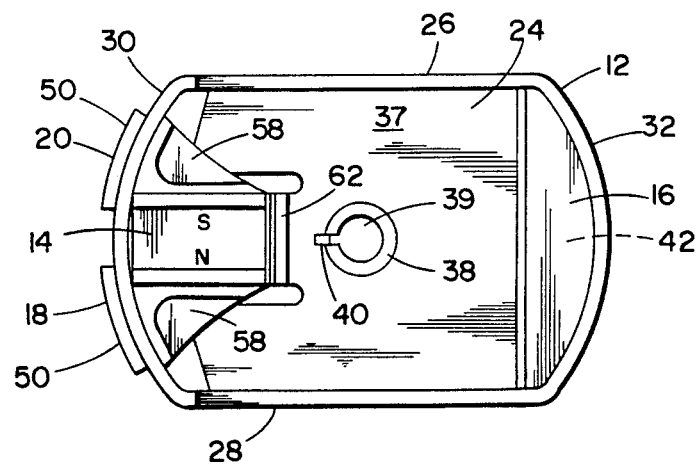
FIG. 5 is a plane bottom view of the rotor assembly of FIG. 1 without its molded resin disk.

Referring also to FIGS. 2, 3, 4 and 5, the rotor 10 shown in FIG. 1 will further be described. The rotor assembly 10 generally comprises a frame or core 12, a permanent magnet 14, a counterweight 16, a first pole shoe 18, a second pole shoe 20 and a molded resin disk 22. With particular reference to FIGS. 4 and 5, the core 12 is generally comprised of a suitable rigid nonferromagnetic material. In a preferred embodiment of the invention, the core is comprised of aluminum. However, any suitable material may be used. The core 12 generally comprises a top wall 24, two relatively long side walls 26, 28 and two relatively short side walls 30, 32. In the embodiment shown, the two long side walls 26 and 28 are relatively straight and the two relatively short side walls 30 and 32 are relatively curved. The top wall 24 and the side walls 26–32 form a general can shape with a relatively open bottom 37. The use of the term can or can shape is generally intended to describe a structural container having a top and side walls capable of retaining elements therein even when rotated to cause centrifugal forces to act upon the elements therein. In the embodiment shown, the can shaped core is capable of containing the counterweight 16, magnet 14, and the pole shoes 18 and 20 even at relatively high revolutions per minute. However, in an alternate embodiment of the invention, the core 12 may be capable of containing additional elements. In addition, the rectangular core 12 may have any suitable shape so long as it can contain elements even at relatively high centrifugal forces and provide for connection to a drive shaft (not shown). In the embodiment shown, the first short side wall 30 comprises two windows 34 and 36 passing therethrough. In an alternate embodiment of the invention, the windows 34 and 36 may actually be provided as slots in the first short side wall 30 either extending upward or downward through the side wall 30, but not extending completely from top to bottom, thus structural integrity is maintained. However, any suitable type of windows may be provided and any suitable means for providing structural integrity around the windows may be provided. A support rib 31 is located between the two windows 34 and 36. A tapered aperture section 38 extends from the top wall 24 and is generally intended to be mounted on a shaft (not shown) of an internal combustion engine. The tapered aperture section 38 comprises a tapered aperture 39 and a key slot 40 such that the rotor assembly can be fixedly mounted to a shaft of an internal combustion engine by a suitable key member (not shown). Because the aperture 39 passing through the tapered aperture section 38 is tapered, this allows the use of the rotor assembly 10 on a tapered shaft (not shown ) which is preferably when mounting a rotor to a shaft. A suitable nut (not shown) would be mounted to the tapered shaft and press down against the top of the aperture section 38 such that, with the key and key slot 40, the assembly 10 would be fixedly mounted to the shaft, but which nonetheless allows for relatively easy removal of the assembly 10 from the shaft for such things as maintenance or repair. The core 12 generally comprises a counterweight receiving area 42 for receiving the counterweight 16 behind the second relatively short side wall 32. The counterweight 16 is provided to balance the assembly 10 along the center axis of the tapered aperture 39 and thereby counteracts the weight of the magnet 14 and pole shoes 18 and 20 such that the assembly can rotate or revolve about the center axis of aperture 39 properly. The counterweight, because of the revolution of the assembly, also reduces vibrations of the assembly 10 as it rotates. The core 12 also comprises a magnet/pole shoe receiving area 44 for positioning and receiving the magnet 14 and pole shoes 18 and 20 behind the first relatively short side wall 30. Preferably the core 12 is made of a nonferromagnetic metallic material of suitable structural strength to contain the counterweight 16, magnet 14, and pole shoes 18 and 20 within the core 12 even at relatively high centrifugal forces such as caused by relatively high revolutions per minute (RPM) such as 25,000 RPM. Although the core 12 can be made of any suitable material and manufactured in any suitable way, in a preferred embodiment, the core 12 is formed by a stamping and extruding process.

In the embodiment shown, the first pole shoe 18 is substantially a mirror image of the second pole shoe 20. The pole shoes 18 and 20 are generally intended to transfer magnetic flux from north and south poles of the magnet 14 to outside of the assembly 10. The pole shoes 18 and 20 each generally comprise a first portion 46 and a second portion 48. The first portion 46 of each of the pole shoes 18 and 20 generally comprises a rectangular extending face section 50 and top and bottom recessed sections 52 and 54. The second portion 48 of each of the pole shoes 18 and 20 comprises a recessed area 56 for receiving at least a portion of the permanent magnet 14. The first portion 46 of each pole shoe is substantially perpendicular to its second portion 48 and a structural support rib 58 is provided to structurally support the perpendicular orientation between the first and second portions. The extending face sections 50 are suitably sized and shaped such that they can pass through the core windows 34 and 36. When the pole shoes 18 and 20 are positioned in the windows 34 and 36 at the magnet/pole shoe receiving area 44, the top and bottom recessed sections 52 and 54 can abut against the interior side of the first relatively short side wall 30. In the embodiment shown, for this purpose, the top and bottom recessed sections 52 and 54 are relatively curved corresponding to the curve of the first relatively short side wall 30. In addition, the extending face sections 50 are also suitably curved for the purpose of conforming to the circular shaped rotor as shown in FIG. 1.

As described above, the second portions 48 of each pole shoe comprises a recessed area 56 for receiving at least a portion of the magnet 14. The magnet 14 is generally sandwiched between the two second portions 48 with each one of its magnetic poles located adjacent a respective pole shoe second portion 48. Because the pole shoes 18 and 20 are comprised of a ferromagnetic material and each one of the magnetic poles of the magnet 14 are located adjacent a separate pole shoe, the magnetic flux generated by the magnet 14 is capable of being transmitted from its north pole through its adjacent pole shoe via the pole shoe's extending face section 50 and eventually back to the magnet's south pole via the second pole shoe's extending face section 50. Because of the recessed areas 56 in the pole shoes 18 and 20 and the orientation of the magnet poles via a substantially transverse orientation as shown, the magnet 14 can substantially retain the pole shoes 18 and 20 thereagainst via its magnetic attraction. In an alternate embodiment of the present invention suitable additional means such as clips may be used to retain the pole shoes 18 and 20 against the magnet 14. In the embodiment shown, the core top wall 24 comprises pole shoe supports 60 which are capable of supporting the pole shoes 18 and 20 at their structural support ribs 58 prior to and during the molding process of the molded resin disk 22. In addition, the core 12 also comprises a rear support 62 extending from the top wall 24. The rear support 62 can generally support the rear of the magnet 14 and pole shoes 18 and 20 prior to and during the molding of the molded resin disk 22.

One method of assembling the assembly 10 would generally comprise the following steps. The core 12 would be stamped and extruded to form the shape as shown in FIG. 4. The core 12 would be orientated in an upsidedown position with the open bottom 37 up. An assembly person would position the counterweight in the counterweight receiving area 42. The assembly person would then sandwich the magnet 14 between two pole shoes 18 and 20 with the magnet being received, at least partially, in the pole shoe receiving areas 56. The pole shoes 18 and 20 and magnet 14 can be inserted into the interior of the can shaped core 12 at the receiving area 44. The face sections 50 of the pole shoes 18 and 20 can extend through the windows 34 and 36. The pole shoes are generally supported, prior to molding of the disk 22, by the core 12 proximate the windows 34 and 36 and by the pole shoe supports 60 of the top wall 24 by the ribs 58. The pole shoes substantially prevent the magnet from becoming dislodged. Thus assembled, the core 12, counterweight 16, magnet 14 and pole shoes 18 and 20 are ready to receive the molded resin disk 22. In an alternate embodiment and method of the invention, clips or any other suitable means may be used to retain the pole shoes 18 and 20 to the core 12. In addition, the pole shoes need not have recessed sections 56 to hold the magnet during assembly and the molding process. Any suitable means may be used to retain the magnet 14 to the core 12 and pole shoes 18 and 20 during assembly and the molding process. Thus, the pole shoe supports 60 and rear supports 62 are primarily provided for ease of assembly and providing structural support to the pole shoes 18 and 20 and magnet 14 during the molding process of the molded resin disk 22.

Referring principally to FIGS. 1, 2 and 3, the molded resin disk 22 is clearly shown. The disk 22 is generally comprised of a thermoplastic material such as glass reinforced nylon. However, any suitable type of material may be used. In the embodiment shown, the disk 22 is insert molded around the core 12. The disk 22 has a plurality of fins 64 for cooling the engine (not shown). The disk 22 generally surrounds the entire core 12 forming a generally circular profile as shown. However, the extending face sections 50 of the pole shoes 18 and 20 are allowed to extend through the disk 22 and are substantially flush with the disk 22 as shown in FIG. 1.

The foregoing description is merely one embodiment of the present invention. The use of a can shaped core comprised of nonferromagnetic material offers many advantages. First, the assembly 10 is relatively light weight, but is nonetheless relatively structurally strong to withstand high centrifugal forces and contain the magnet, pole shoes and centerweight. Because a nonferromagnetic core is used with ferromagnetic pole shoes, loss of magnet flux and thus loss of potential energy is greatly reduced. Because the core is comprised of a single member it reduces the weight of the assembly. Because the core has a tapered and keyed shaft aperture it can be securely fastened and removed from a drive shaft as desired. Because the assembly comprises a molded resin disk, the assembly is light weight and can have fins for cooling an engine. As described above, although the features of the present invention were described with regard to the embodiment shown in FIG. 1, the invention may have many alternate forms. For example, more than one magnet/pole shoe assemblies may be provided. The counterweight may be replaced by an additional magnet/pole shoe assembly with appropriate windows in the second relatively short side. Any suitable type of cover can be used rather than a molded resin disk. Other variations can undoubtedly to devised by those skilled in the art.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A flywheel magnet rotor assembly comprising:
   core means being comprised of a rigid nonferromagnetic material, said core means having a top wall and side walls extending therefrom, said side walls being attached to adjacent side walls to form a general can shape, one of said side walls having an aperture means therethrough;
   magnet means comprising a permanent magnet located inside said general can shape with a magnetic north pole and a magnetic south pole proximate said aperture means;
   pole means comprising first and second ferromagnetic pole shoes, said first pole shoe having a first portion extending through said aperture means and a second portion being located adjacent said magnetic north pole, and said second pole shoe having a first portion extending through said aperture means and a second portion being located adjacent said magnetic south pole; and
   molded resin disk means substantially surrounding said core means whereby there are substantially no magnetic losses between said magnet means and said core means, said core means adapted to retain said magnet means and pole means in the assembly even at relatively high revolutions per minute of the assembly and substantially all of the magnetic flux from said magnet means can be directed through said pole shoes.

2. An assembly as in claim 1 wherein said core means side walls form a general rectangular shape with two relatively long sides and two relatively short curved sides, said aperture means extending through one of said relatively short curved sides.

3. An assembly as in claim 1 wherein said top wall has a tapered aperture extension for connection to a tapered shaft.

4. An assembly as in claim wherein said core means is a single stamped member.

5. An assembly as in claim 2 wherein said aperture means comprises a first aperture and a second aperture with a portion of said core means therebetween and said permanent magnet is located inside said core means general rectangular shape with said north and south poles being relatively transversely orientated in said general can shape generally radially between said first and second apertures.

6. An assembly as in claim 1 wherein said pole shoes are magnetically connected to said magnet.

7. An assembly as in claim 1 further comprises means for attaching said poles shoes to said magnet.

8. An assembly as in claim 1 wherein said pole shoes each comprise a recess in said second portions for receiving at least a portion of said magnet.

9. An assembly as in claim 1 wherein said pole shoe first portions are substantially perpendicular to said pole shoe second portions 10. An assembly as in claim 1 wherein said pole shoe second portions have a relatively curved outer face.

11. An assembly as in claim 1 wherein said disk means comprises cooling fins.

12. An assembly as in claim 1 further comprising a counterweight opposite said magnet and pole shoes.

13. An assembly as in claim 1 wherein said aperture means comprises a first aperture and a second aperture.

14. A rotor for use with a magneto system, the rotor comprising:
 a core comprised of a relatively thin nonferromagnetic material, said core having a general can shape with a top wall and side walls extending from said top wall, said side walls being connected to adjacent side walls to form a generally rectangular can shaped enclosure;
 a magnet located inside said enclosure;
 pole shoes at least partially located inside said enclosure; and
 a molded resin cover substantially surrounding said core such that said enclosure formed by said general can shape of said core can retain said magnet and said pole shoes inside said core at relatively high revolutions per minute and, the rotor is relatively lightweight.

15. A rotor as in claim 14 wherein said core is comprised of a single member of stamped and extruded nonferromagnetic metal.

16. An assembly as in claim 15 wherein said top wall has an extruded tapered aperture.

* * * * *